(12) United States Patent
Takemoto et al.

(10) Patent No.: US 6,351,449 B1
(45) Date of Patent: Feb. 26, 2002

(54) OPTICAL DISK WITH RECESSES INSIDE AN INNER CIRCUMFERENCE OF AN INFORMATION RECORDING AREA AND METHOD OF MAKING SAME

(75) Inventors: Hiroyuki Takemoto; Hiroki Tsuchiya, both of Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/149,022

(22) Filed: Sep. 8, 1998

(30) Foreign Application Priority Data

Sep. 9, 1997 (JP) .............................. 9-244227

(51) Int. Cl.[7] .............................. G11B 7/24
(52) U.S. Cl. .................. 369/275.4; 369/275.3; 369/282
(58) Field of Search ............... 369/13, 59.1, 47.15, 369/47.1, 53.11, 275.3, 275.4, 275.1, 276, 277, 278, 279, 282, 271

(56) References Cited

U.S. PATENT DOCUMENTS 5,210,738 A * 5/1993 Iwata et al. .............. 369/275.1
5,796,711 A * 8/1998 Tomita et al. ............ 369/275.4
5,953,299 A * 9/1999 Miymato et al. ............. 369/59
6,002,663 A * 12/1999 Sandstrom .................. 369/282

* cited by examiner

*Primary Examiner*—Ali Neyzari
(74) *Attorney, Agent, or Firm*—Sonnenschein, Nath & Rosenthal

(57) ABSTRACT

An optical disc 1 has formed in an area inside the inner circumference of an information recording area 2 formed thereon concentric or spiral continuous or discontinuous recesses 4a at a lager pitch than the track pitch in the information recording area 2. The optical disc is manufactured by installing a hub 5 substantially in the center of an optical disc substrate with reference to the recesses 4a by positioning the hub 5 with respect to the optical disc substrate. A stamper for manufacturing the optical disc substrates is produced by exposing a photoresist layer 11 to a laser beam by turning on and off the laser beam while rotating a glass substrate 10 having the photoresist layer 11 applied thereon and scanning the laser beam radially of the glass substrate 10.

9 Claims, 13 Drawing Sheets

OPTICAL DISK WITH RECESSES INSIDE AN INNER CIRCUMFERENCE OF AN INFORMATION RECORDING AREA AND METHOD OF MAKING SAME

BACKGROUND OF THE INVENTION

1. Field of the Invention

The present invention relates to an optical disc having an annular information recording area and a hub located substantially in the center thereof and which supports the optical disc, a method of manufacturing the optical disc, and a method of producing a stamper for a substrate for the optical disc.

2. Description of Related Art

Each of the optical discs comprises essentially a disc-shaped substrate made of plastic, and a recording layer a formed on the substrate. Some of the optical discs has a hub disposed substantially in the center thereof as a support member.

Concerning an optical disc of 130 mm (5.25 inches) in diameter, ISO standard prescribes an optical disc having a hub made of a magnetic-sensitive material. The optical disc is of an air-sandwich structure having a hole formed in the center thereof and two resin-made disc-shaped substrates, at least one of them having a recording layer formed thereon, and the two substrates being joined to each other with the recording layer placed inside. The hub is joined to both the substrates.

When an optical disc having such a hub is set on a disc table in an optical disc drive for recording and/or reproducing an information into and/or from the optical disc, the optical disc can be chucked to the disc table with the hub. That is to say, the hub is used to securely set and hold the optical disc on the disc table. More particularly, the hub is made of a metallic material and has formed in the center thereof a center hole through which a spindle shaft of the disc drive is introduced. When the optical disc is set on the disc table, the hub is attracted by a magnet in the disc table to chuck the optical disc.

Therefore, in manufacturing an optical disc having such a hub, the hub must be joined to the optical disc in such a manner that the center of rotation of the hub coincides highly precisely with that of an information recording area formed on a substrate of the optical disc.

Two typical conventional methods used to join a hub to an optical disc will be described herebelow by way of example:

The first one of the two methods is such that a center hole is formed in the center of an optical disc substrate to be concentrical with the center of rotation of an information recording area formed on the optical disc substrate and a hub is fitted and joined concentrically with the center hole. By this method, the hub can be joined rather easily. However, the center hole should be formed in thee optical disc substrate not to be eccentric to the center of rotation of the information recording area and to have a highly accurate diameter. Both these requirements are difficult to meet by this method.

The second method utilizes an X-Y table to position the hub and optical disc with reference to the boundary between the information recording area formed on the optical disc and the inner circumference of the information recording area and join the hub to the optical disc substrate so that the center of rotation of the information recording area coincides with the center of the hub.

Examples of the joining of hub to optical disc by the second method are disclosed in the Japanese Published Unexamined Patent Nos. 63-76131 and 4-49543. The principle of this second method will be described with reference to FIG. 1. As shown, an optical disc 100 has formed thereon an information recording area 101 in which convexities and concavities are formed, and a mirror area 102 located inside the inner circumference of the information recording area 101 and in which no convexities and concavities are formed. A difference in reflected quantity of light between the information recording area 101 and mirror area 102 is used to identify a boundary between the areas 101 and 102. In this case, the difference in reflected quantity of light is a difference in scattered quantity of light between the areas 101 and 102. Note that a common optical disc has a similar construction to that of the optical disc 100 shown in FIG. 1, and it has a center hole 103 formed substantially in the center thereof as will also be seen from FIG. 1.

In the field of optical data storage, however, the data storage density demanded for optical discs has been increasingly greater year after year, so that there is a tendency that the track pitch in the information recording area has become correspondingly narrower. In the case of an optical disc of 130 mm in diameter, for example, as the technology in consideration has been innovated, the track pitch of the information recording area has been reduced from 1.6 $\mu$m, to 1.39 $\mu$m, 1.15 $\mu$m, and further to 0.85 $\mu$m for a higher density of data storage.

In the second method, however, such a small track pitch will vary the angle of light scattering by the convexities and concavities in the information recording area changes, so the reflected quantity of light from the information recording area can be less detected. Thus, the difference in reflected quantity of light between the information recording area and mirror area on the optical disc is difficult to detect by the second method, thus it is not possible to accurately locate or identify the boundary between the information recording area and mirror area that is the reference for correct positioning of the hub.

The above will be described further with reference to FIGS. 2 and 3 being schematic diagrams, respectively, of a system for measuring the light reflection from an optical disc. The system in FIG. 2 measures the reflected light from one conventional optical disc 200 having a large track pitch in an information recording area 201 formed thereon. As illustrated, the optical disc 200 is irradiated with a light from a light source 203. The reflected light from the information recording area 201 on the optical disc 200 is detected by a CCD 204, and monitored on a display 205. FIG. 2 also shows how the light is reflected by the optical disc 200.

Similarly, the system in FIG. 3 measures the reflected light from another conventional optical disc 300 having a small track pitch in an information recording area 301 formed hereon. As illustrated, the optical disc 300 is irradiated with a light from a light source 203. The reflected light from the information recording area 301 on the optical disc 300 is measured by the CCD 204, and monitored on the display 305. FIG. 3 also shows how the light is reflected by the optical disc 300.

As seen from FIG. 2, the CCD 204 detects much reflected light, namely, much scattered light, from the information recording area 201 having the large track pitch. However, the CCD 204 detects less reflected light from the information recording area 301 having the small track pitch, as will be known from FIG. 3. This is because the small track pitch in the information recording area 301 causes a variation of the scattering angle of light or the like.

As mentioned above, the small track pitch in the information recording area will reduce the reflected quantity of light from the information recording area. Thus, a boundary between the information recording area and mirror area cannot disadvantageously be identified accurately by the second method unless a hubbing machine is adjusted concerning incident angle and incident quantity of the light correspondingly to each track pitch.

SUMMARY OF THE INVENTION

Accordingly, the present invention has an object to overcome the above-mentioned drawbacks of the prior art by providing an optical disc, method of manufacturing the optical disc and a method of producing a stamper for a substrate for the optical disc, by which the boundary between an information recording area and mirror area formed on an optical disc substrate can be identified more easily and accurately for an accurate joining of a hub to the optical disc substrate.

The above object can be accomplished by proving an optical disc having an annular information recording area and a hub fixed substantially in the center thereof.

In particular, the optical disc according to the present invention has formed inside the inner circumference of the information recording area concentric or spiral continuous or discontinuous recesses at a larger pitch than a track pitch in the information recording area.

Because of the above recesses formed inside the inner circumference of the information recording area and larger recess pitch than the track pitch in the information recording area, the recesses will reflect, in a constant and sufficient quantity for detection, a light irradiated from a hubbing machine during hubbing of (installation of a hub to) an optical disc substrate without the necessity of changing the incident angle and quantity of the light from the hubbing machine correspondingly to the magnitude of the track pitch in the information recording area.

Thus, it is possible to easily identify, based on the reflected light, the boundary inside the inner circumference of the information recording area with reference to the recesses, thereby permitting to join a hub to the optical disc in a correct position.

The above object can also be accomplished by providing a method of manufacturing the optical disc according to the present invention, in which to install a hub substantially in the center of an optical disc substrate having an annular information recording area formed thereon, concentric or spiral continuous or discontinuous recesses are formed inside the inner circumference of the information recording area at a larger pitch than a track pitch in the information recording area and the recesses are taken as a reference marker to position the hub with respect to the optical disc substrate.

In the above-mentioned optical disc manufacturing method, the recesses formed inside the inner circumference of the information recording area are taken as the reference marker to position the hub with respect to the optical disc substrate, so that the hub can be joined accurately to the optical disc substrate independently of the magnitude of the tack pitch in the information recording area.

Also, the above object can be accomplished by providing a method of producing a stamper for the optical disc substrate in which a substrate having a photoresist layer formed on the surface thereof is rotated and the photoresist layer is exposed while a laser beam is being scanned radially of the substrate, and the laser beam is selectively turned on and off to form, by exposure to the laser beam, inside the inner circumference of an information recording area concentric or spiral continuous or discontinuous recesses at a larger pitch than a track pitch Tp in the information recording area.

When exposing the photoresist layer while scanning the laser beam radially of the substrate, the laser beam is selectively turned on and off to form, by the laser exposure, the concentric or spiral continuous or discontinuous recesses at the larger pitch than the track pitch in the information recording area. Therefore, the recesses will reflect, in a constant and sufficient quantity for detection, a light irradiated from the hubbing machine during hubbing of the optical disc substrate without the necessity of changing the incident angle and quantity of the light from the hubbing machine correspondingly to the magnitude of the track pitch in the information recording area.

Thus, it is possible to accurately identify, based on the reflected light from the recesses, the boundary inside the inner circumference of the information recording area with reference to the recesses, thereby permitting to correctly position the hub with respect to the optical disc substrate.

BRIEF DESCRIPTION OF THE DRAWINGS

These objects and other objects, features and advantages of the present intention will become more apparent from the following detailed description of the present invention when taken in conjunction with the accompanying drawings, of which.

DETAILED DESCRIPTION OF THE PREFERRED EMBODIMENTS

Figure 1:
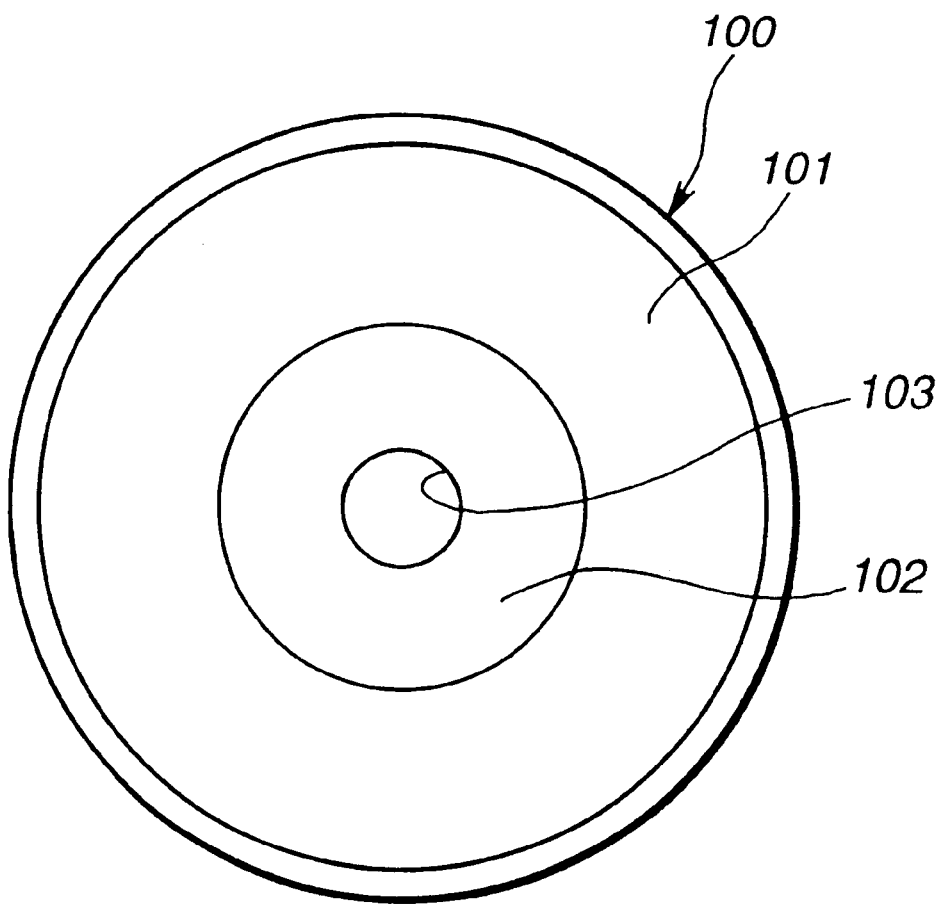
FIG. 1 is a plan view of an example of the conventional optical disc.
Figure 2:
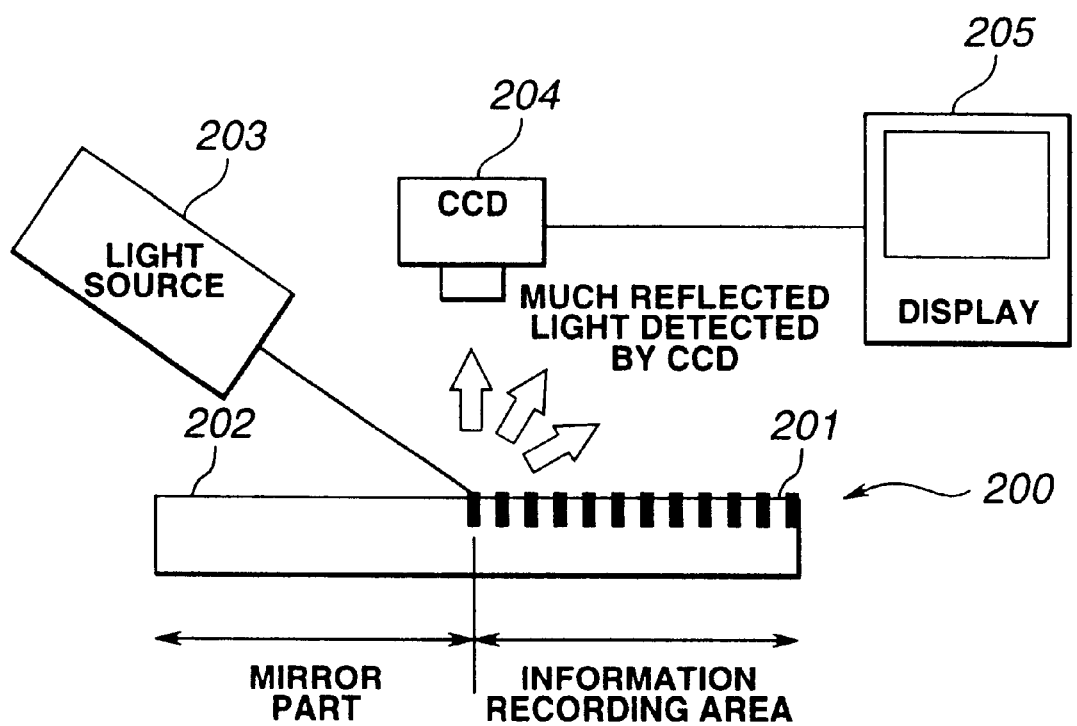
FIG. 2 is a schematic diagram of the system for monitoring the light reflection from a conventional optical disc having a large track pitch in the information recording area thereof.
Figure 3:
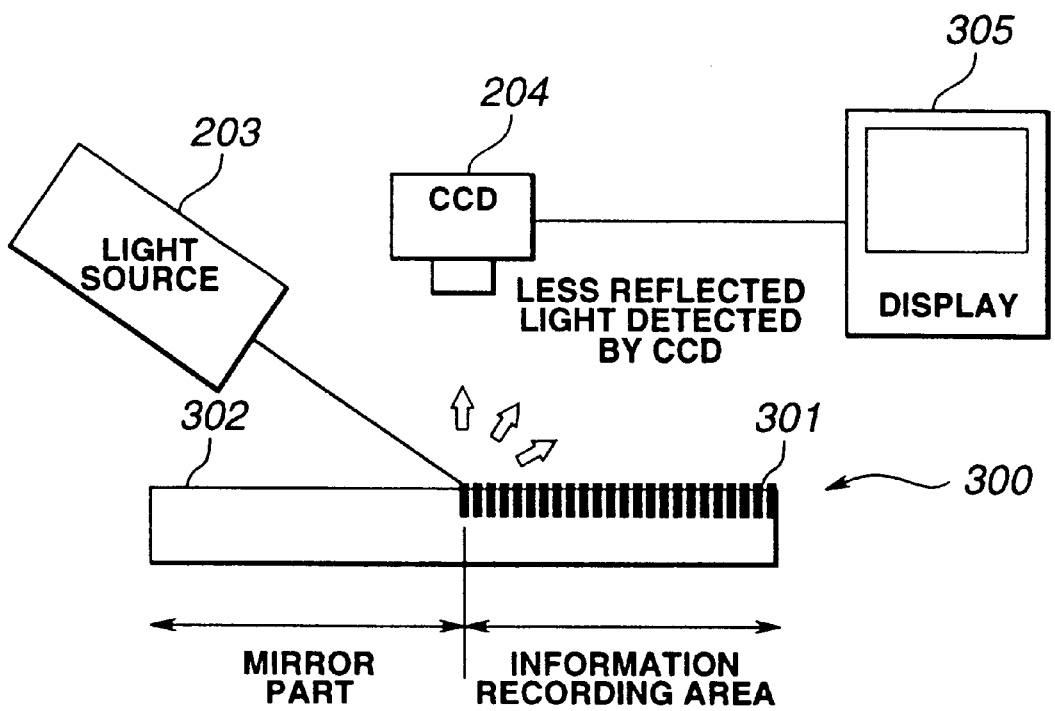
FIG. 3 is also a schematic diagram of a system for monitoring the light reflection from a conventional optical disc having a small track pitch in the information recording area thereof.
Figure 4:
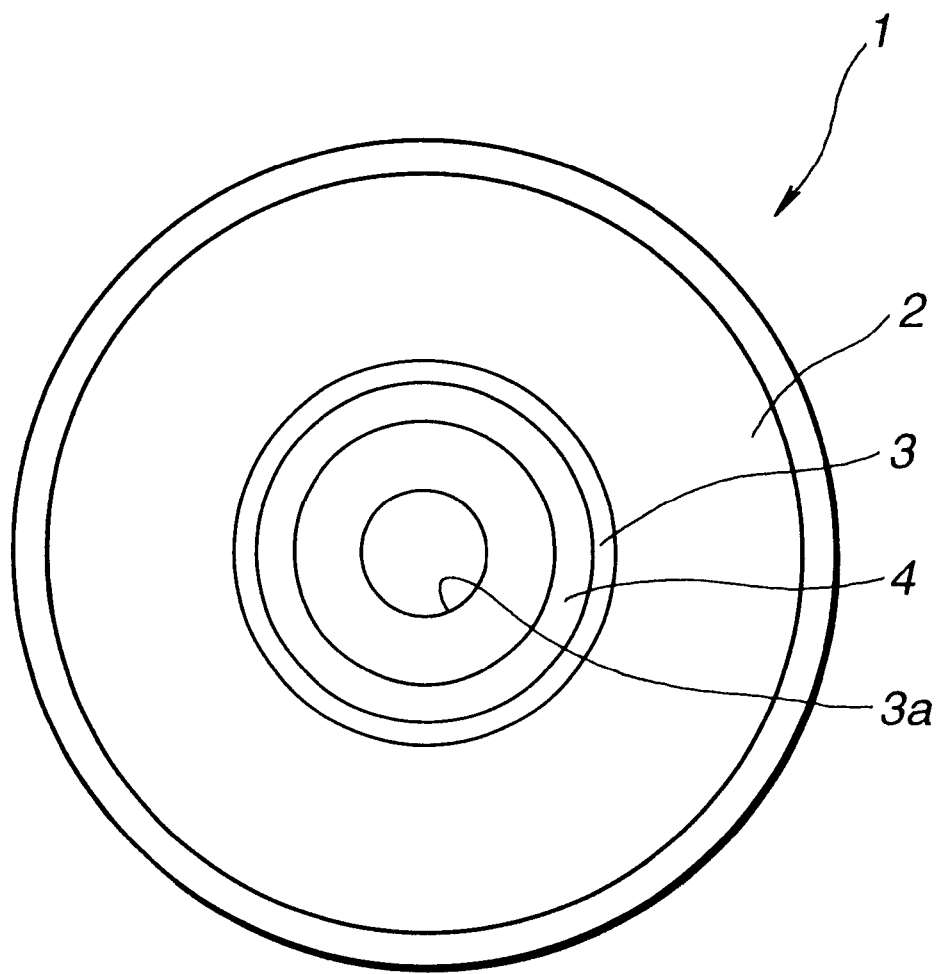
FIG. 4 is a plan view of an example of the optical disc according to the present invention.
Figure 5:
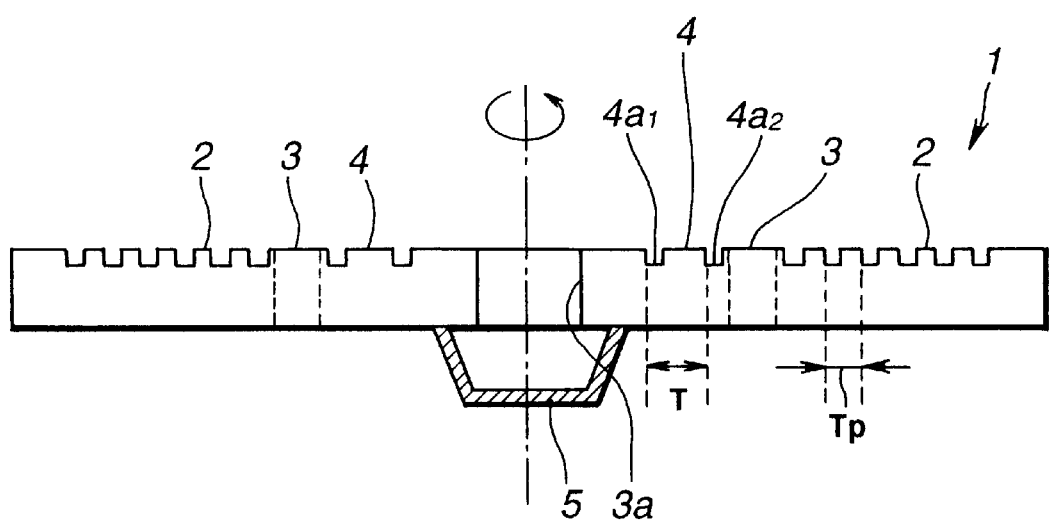
FIG. 5 is a sectional view of the optical disc in FIG. 4.

FIG. 4 is a plan view showing the configuration of the an optical disc according to the present invention, and FIG. 5 is a sectional view of the optical disc in FIG. 4.

As shown in FIGS. 4 and 5, the optical disc 1 of the present invention comprises an annular information recording area 2 in which convexities and concavities are formed, a mirror area 3 located inside the inner circumference of the information recording area 2 and in which no such convexities and concavities are formed, and a reference marker area 4 located inside the inner circumference of the mirror area 3 and in which concentric or spiral continuous or discontinuous recesses are formed about a center hole 3a formed substantially in the center of the optical disc 1.

More particularly, the optical disc 1 has a hub 5 joined thereto about the center hole 3a as shown in FIG. 5.

The information recording area 2 has formed therein a predetermined pattern of convexities and concavities corresponding to information signals. For example, a magneto-optic disc has a data area including convexities as lands and concavities as grooves and in which an information is recorded, and a preformatted area in which a pit for providing a positional information is formed. Such magneto-optic discs include, for example, an in-groove recording type in which information is recorded on grooves and a pit in the preformatted area provides a positional information, and an on-land recording type in which information is recorded on lands and pits are also formed on the lands to provide a positional signal.

The mirror area 3 is formed inside the inner circumference of the information recording area 2 and has no convexities and concavities formed therein.

Figure 6:
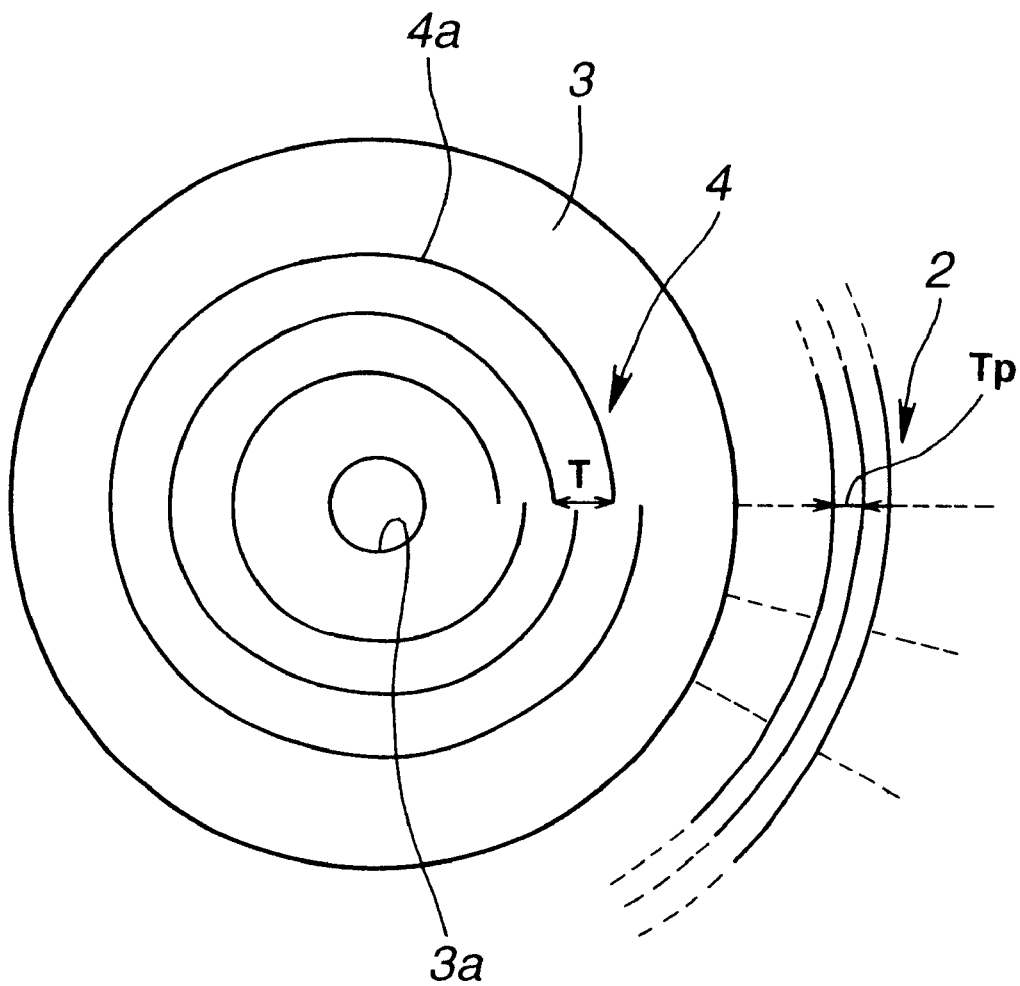
FIG. 6 is a plan view of an example of the reference marker area on the optical disc according to the present invention.

FIG. 6 is a plan view of the reference marker area 4 on the optical disc, showing recesses 4a formed in the marker area 4 and a track pitch Tp in the information recording area 2.

As shown in FIG. 6, the marker area 4 formed on the optical disc 1 of the present invention has spiral continuous or discontinuous recesses 4a formed therein about the center hole 3a formed substantially in the center of the optical disc 1.

In particular, according to the present invention, a distance between recesses $4a_1$ and $4a_2$, namely, a pitch T of the recesses 4a, on the optical disc 1 is set larger than the track pitch Tp in the information recording area 2 as will be seen from FIG. 5.

As shown in FIG. 6, for example, the recesses 4a are adjacent to the mirror area 3 so that the pitch T has a magnitude with which the recesses 4a can be discriminated from the mirror area 3. If the pitch T of the recesses 4a is at least 1.1 gm or more, for example, preferably, about 1.6 μm, the marker area 4 or recesses 4a therein will reflect, in an ample quantity for detection, a light irradiated from a hubbing machine during hubbing of a hub to the optical disc substrate.

Given a track pitch Tp of the information recording area 2, the recesses 4a can be formed at a pitch T of $(n+1) \times Tp$ using a stamper produced by the method which will be described later.

Also, using another stamper produced by the method which will also be described later, the recesses 4a can be formed at a pitch of $(2n+1)/2 \times Tp$.

As having been described in the foregoing, since the optical disc 1 according to the present invention has formed thereon the reference marker area 4 in which spiral recesses 4a are formed inside the inner circumference of the information recording area 2 at the pitch T larger than the track pitch Tp in the information recording area 2, even when the track pitch Tp in the information recording area 2 has to be smaller to meet a requirement for a higher density of data storage, the recesses 4a will reflect, in a constant and sufficient quantity for detection, a light irradiated from the hubbing machine during hubbing of an optical disc substrate without the necessity of changing the incident angle and quantity of the light from the hubbing machine correspondingly to the magnitude of the track pitch Tp in the information recording area 2.

Thus, it is possible to easily identify, based on the reflected light from the marker area 4, the boundary inside the inner circumference of the information recording area 2 with reference to the reference marker area 4, thereby permitting to correctly position a hub with respect to an optical disc substrate.

Note that the recesses 4a may be formed adjacent to the inner circumference of the information recording area 2. That is to say, the marker area 4 may be formed anywhere inside the inner circumference of the information recording area 2 and which is in conformity with the requirement given in the ISO standard so long as the pitch T of the recesses 4a is larger than the track pitch Tp in the information recording area 2.

Also, the recesses 4a may be formed concentrically about the center hole 3a so long as the pitch T of the recesses is larger than the track pitch Tp in the information recording area 2.

Further, the recesses 4a may be discontinuous concavities, namely, a train of pits so long as each pit in the pit train is larger than the track pitch Tp in the information recording area 2.

As previously mentioned, the hub 5 is joined substantially to the center of the optical disc 1 by using an X-Y table to position the hub 5 with reference to the boundary of the information recording area 2 that is identified based on the detection of a reflected light from the marker area 4 so that the center of rotation of the information recording area 2 coincides with the center of the hub 5.

Next, the method of manufacturing an optical disc having the aforementioned configuration will be discussed herebelow.

In this method of the present invention, a hub 5 is installed substantially in the center of the optical disc substrate having an annular information recording area 2 formed thereon, by forming concentric or spiral continuous or discontinuous recesses 4a in an area inside the inner circumference of the information recording area 2 at a larger pitch than the track pitch Tp in the information recording area 2 and with reference to the marker area 4 having the recesses 4a to position the hub 5 with respect to the optical disc substrate.

The marker area 4 having the recesses 4a formed therein inside the inner circumference of the information recording area 2 can reflect, in a constant and sufficient quantity, a light irradiated from the hubbing machine independently of the magnitude of the track pitch Tp in the information recording area 2.

Thus, it is possible to accurately identify, based on the reflected light from the marker area 4 having the recesses 4a formed therein, the boundary inside the inner circumference of the information recording area 2 with reference to the reference marker area 4, thereby permitting to correctly position a hub with respect to an optical disc substrate.

Next, the method of producing a stamper for the optical disc substrate having the aforementioned configuration will be described in detail. In the following, a description will be made of an optical disc substrate having convexities and concavities, but the present invention is not limited only to this type of optical disc substrate.

Figure 7:
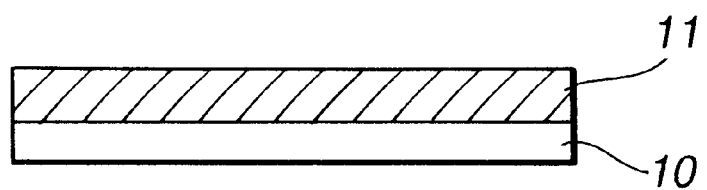
FIG. 7 is a schematic sectional view of a glass substrate on which a photoresist is applied in the process of producing a stamper according to the present invention.

FIG. 7 is a sketch of a glass substrate 10 containing a coupling agent, on which a photoresist layer 11 is applied by a spinner in the process of photoresist application.

Figure 8:
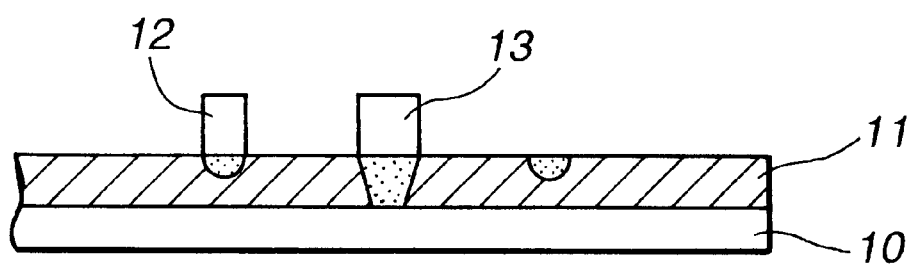
FIG. 8 is also a schematic sectional view of the glass substrate on which the photoresist is exposed to laser beams.

In the process of laser exposure shown in FIG. 8, the photoresist layer 11 applied to the glass substrate 10 is exposed to laser beams.

As shown in FIG. 8, while the glass substrate 10 is being rotated, the photoresist layer 11 corresponding to the information recording area is exposed to a laser beam from a first laser source 12 to form a latent image of a groove, and also to a laser beam from a second laser source 13 to form a latent image of a pit. The relation between the first and second laser sources 12 and 13 is shown in FIG. 9, a schematic sectional view showing the laser exposures in FIG. 8 in further detail.

Figure 9:
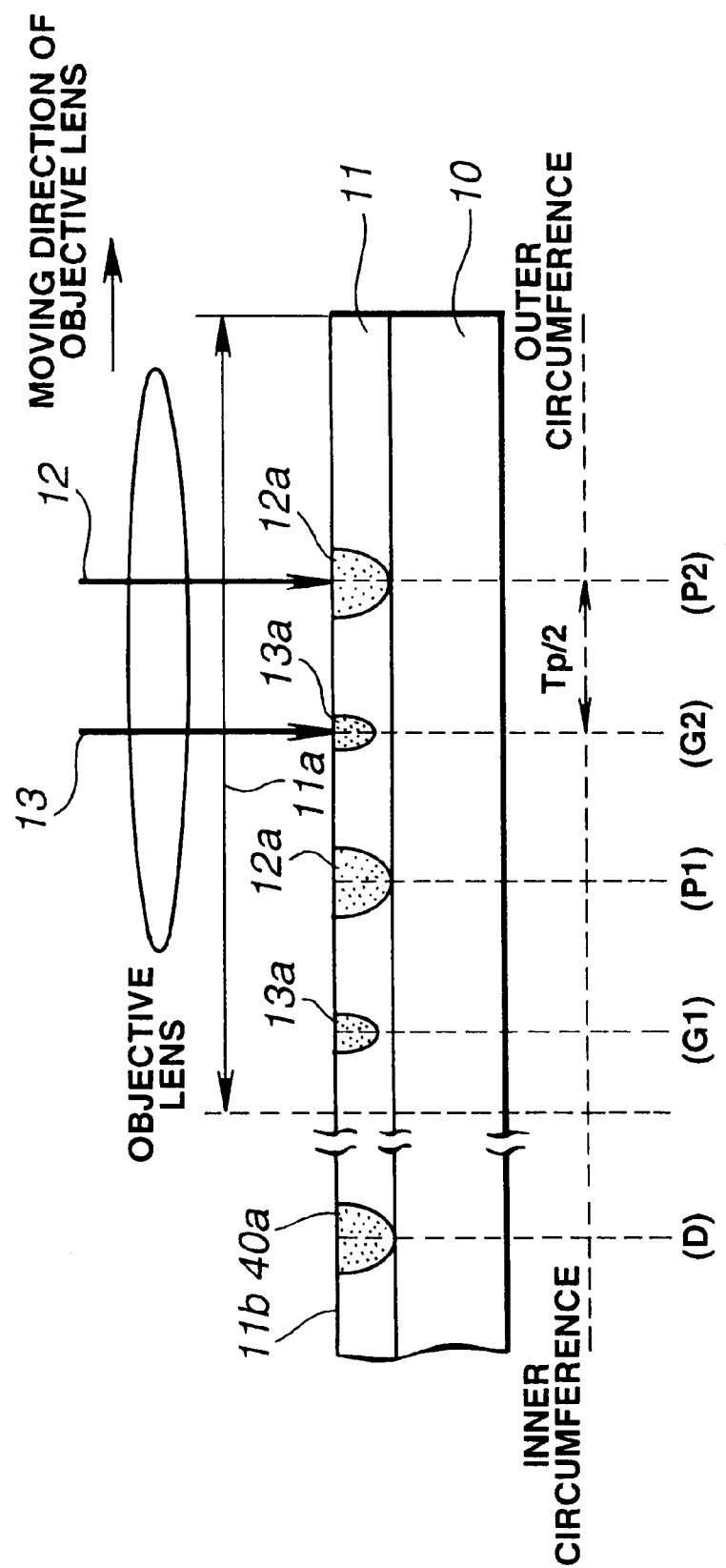
FIG. 9 is a schematic sectional view showing the laser exposures in FIG. 8 in further detail.

As shown in FIG. 9, the second laser source 13 is located at a distance of ½×Tp from the first laser source 12, and they are operatively coupled with each other.

A portion 11a of the photoresist layer 11 corresponding to the information recording area is exposed to the laser beam from the first source 12 to form a latent image 12a of a pit, and to the laser beam from the second source 13 to form a latent image 13a of a groove.

There is provided an objective lens for focusing the laser beam onto the photoresist layer 11. Interlocked with the first and second laser sources 12 and 13, the objective lens is moved Tp per rotation of the glass substrate 10 radially of the glass substrate 10.

According to the present invention, further to the pit latent image 12a and groove latent image 13a formed in the portion 11a of the photoresist 11 corresponding to the information recording area 2, a latent image 40a for the recess 4a (will be referred to as recess latent images hereinafter) is formed in an area 11b on the photoresist 11 corresponding to the area inside the inner circumference of the information recording area 2, namely, an area corresponding to the marker area 4 on the photoresist 11 by exposure to the laser beam as will be shown in FIG. 10

Figure 10:
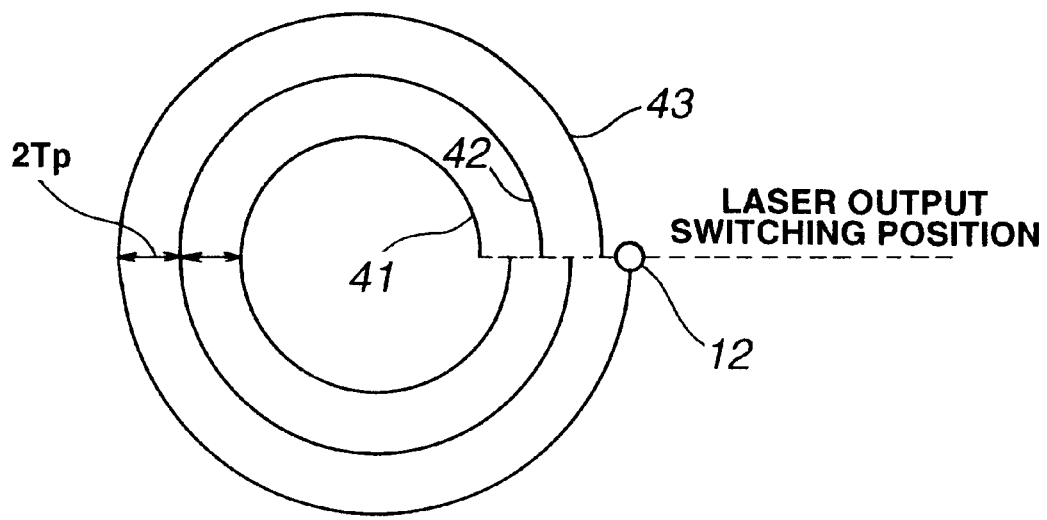
FIG. 10 is a plan view showing an example of recesses formed on the optical disc substrate according to the present invention.
Figure 11:
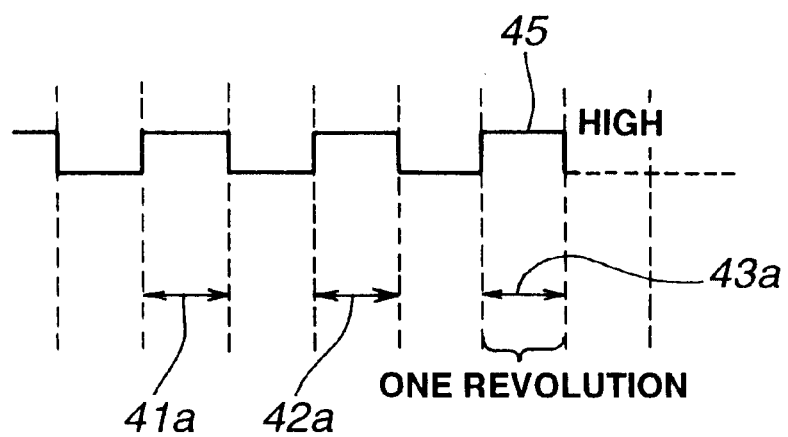
FIG. 11 is a timing chart of pulses controlling the laser in forming the recesses during the laser exposure.

FIG. 10 is a plan view showing recess latent images 41, 42 and 43 formed on the photoresist 11. FIG. 11 is a timing chart of pulses controlling the laser source in forming the recesses during the laser exposure.

The reference 45 indicates a control pulse applied to an optical modulating element in the laser source. The control pulse 45 controls the optical modulating element to output a laser beam when the pulse 45 is at the HIGH level.

To form the recess latent image, the control pulse 45 allows the optical modulating element to output a laser beam toward the glass substrate 10 for one rotation at every n rotations of the glass substrate 10 as shown in FIGS. 10 and 11.

As shown in FIG. 10, for example, the first pulse wave 41a allows an exposure to laser beam for one rotation of the glass substrate 10 to form the recess latent image 41. After the glass substrate 10 is rotated one full turn with no laser exposure, the second pulse wave 42a allows an exposure to laser beam for one more rotation of the glass substrate 10 to form the recess latent image 42. Further, after the glass substrate 10 is rotated one full turn with no laser exposure, the third pulse wave 43a allows an exposure to laser beam for a further rotation of the glass substrate 10 to form the recess latent image 43. Through repetition of this process, spiral recess latent images will be formed.

As shown in FIG. 10, the photoresist layer 11 is exposed to the laser beam at every rotation of the glass subject 10 to form recess latent images having a pitch 2Tp between the centers T of the recesses.

In the process of laser exposure as shown in FIG. 8, recess latent images having a pitch T of (n+1)×Tp can be formed in an area corresponding to the marker area 4 on the photoresist layer 11 by switching the exposure of one laser beam at every n rotations, namely, by turning on and off the laser beam output, with the laser beam feed pitch set equal to the track pitch Tp in the information recording area 2.

The process of laser exposure according to the present invention has been described in the foregoing.

Figure 12:
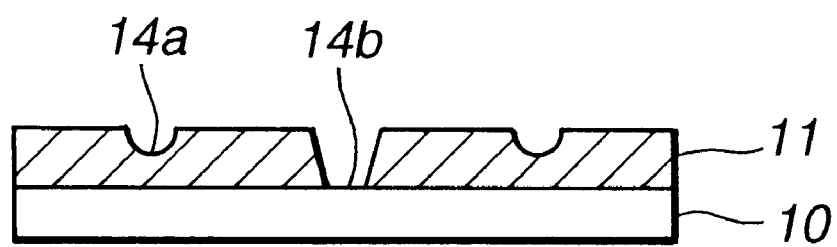
FIG. 12 is a schematic sectional view of the glass substrate on which the photoresist exposed to the laser beams is developed.

The aforementioned laser exposure process is followed by a step of development. As shown in FIG. 12, an alkaline developing solution is used to remove the groove latent image 13a, pit latent image 12a and recess latent image 40a formed in the above-mentioned process of laser exposure to form a concavity 14a for the groove, a concavity 14b for the pit, and a concavity (not illustrated) for the recess 4a.

Figure 13:
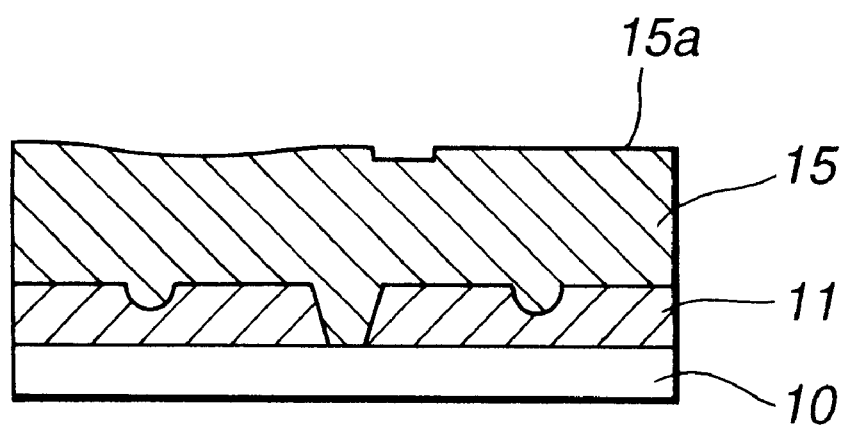
FIG. 13 is also a schematic sectional view of the glass substrate on which the developed photoresist is metal-plated.

Next, a metal plating process is effected. As shown in FIG. 13, the surface of the developed photoresist 11 is made electrically conductive by a chemical plating method or the like to form a stamper 15 made of a metal plate.

Figure 14:
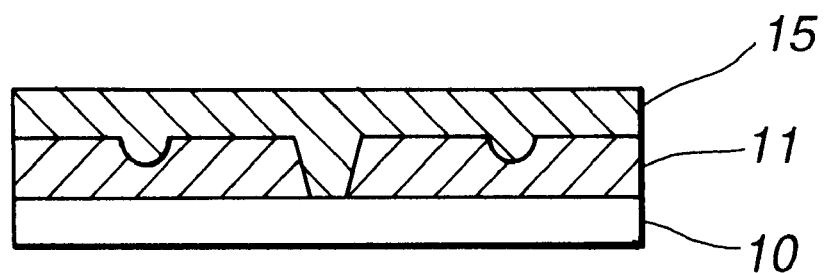
FIG. 14 is a schematic sectional view of the glass substrate on which the plated metal on the photoresist is polished to produce a stamper.

In a next polishing process, the stamper 15 made of the metal plate is smoothed a surface 15a thereof by polishing as shown in FIG. 14.

Figure 15:
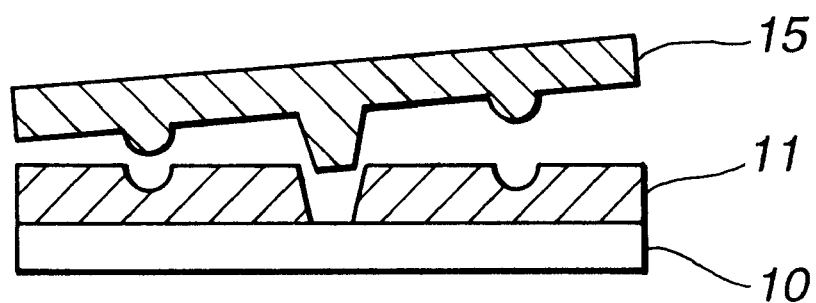
FIG. 15 is a schematic sectional view showing the stamper being separated from the assembly of the glass substrate and photoresist.

Finally, as shown in FIG. 15, the stamper 15 is separated from the glass substrate 10 and photoresist layer 1. The stamper 15 is used to produce a substrate for the optical disc 1 according to the present invention.

Furthermore, the method of recess latent image formation in the process of laser exposure in the method of producing the stamper for the optional disc substrate according to the present invention will be described in detail.

In the method of producing the stamper for the optical disc substrate according to the present invention, the glass substrate 10 having the photoresist layer 11 applied on the surface thereof is rotated during the laser exposure. At every n rotations of the glass substrate 10, the laser exposure is selectively switched for the photoresist layer 11, namely, the photoresist layer 11 is exposed to the laser beams while the laser output is being turned on and off.

Thereby, a predetermined pattern of concavities, or a pattern of groove latent images 12a and pit latent images 13a, for example, is formed in the area 11a on the photoresist layer 11 corresponding to the information recording area 2 of the optical disc 1, and a concentric or spiral continuous or discontinuous recess about a center hole in the optical disc substrate, more particularly, recess latent image 40a, is formed in the predetermined area 11b on the photoresist layer 11 corresponding to an area inside the inner circumference of the information recording area 2, namely, an area on the photoresist layer 11 corresponding to the marker area 4

Further, these latent images are developed in the developing process to form the concavities for the grooves in the information recording area 2, concavities for the pits in the area 2, and the concavities for the recesses 4a in the marker area 4.

According to the present invention, the pitch of the recesses formed after the laser exposure and development processes can be set larger than the track pitch Tp in the information recording area 2.

Therefore, since a constant reflected light from the marker area 4 having the recesses 4a formed therein can be detected in hubbing the optical disc substrate produced by the method according to the present invention, namely, the optical disc 1 molded using the stamper 15 produced as aforementioned, it is possible to accurately identify, based on the reflected light from the marker area 4, the boundary inside the inner circumference of the information recording area 2 with reference to the reference marker area 4 independently of the magnitude of the track pitch Tp in the information recording area 2, thereby permitting to correctly position a hub with respect to an optical disc substrate.

In the process of laser exposure as having been described with reference to FIG. 10, a single laser source, for example, either the first laser source 12 for the grooves or the second laser source 13 for the pits, can be used to repeat the exposure at every n rotations of the glass substrate 10 with the laser feed pitch set equal to the track pitch Tp in the information recording area 2, thereby producing recess latent images 40a having a pitch of (n+1)×Tp. Therefore, after the development of the photoresist layer 11, recesses 4a can be formed at the pitch of (n+1)×Tp Note that the present invention is not limited to the aforementioned method having been described in the foregoing with reference to FIG. 10, but it can be applied to a formation of recess latent images as will be described below.

In this variant of the method of forming recess latent images, two laser sources, for example, the first laser source 12 for the grooves and second laser source 13 for the pits, are used to generate laser beam to the photoresist layer 11, thereby forming the recess latent images.

Figure 16:
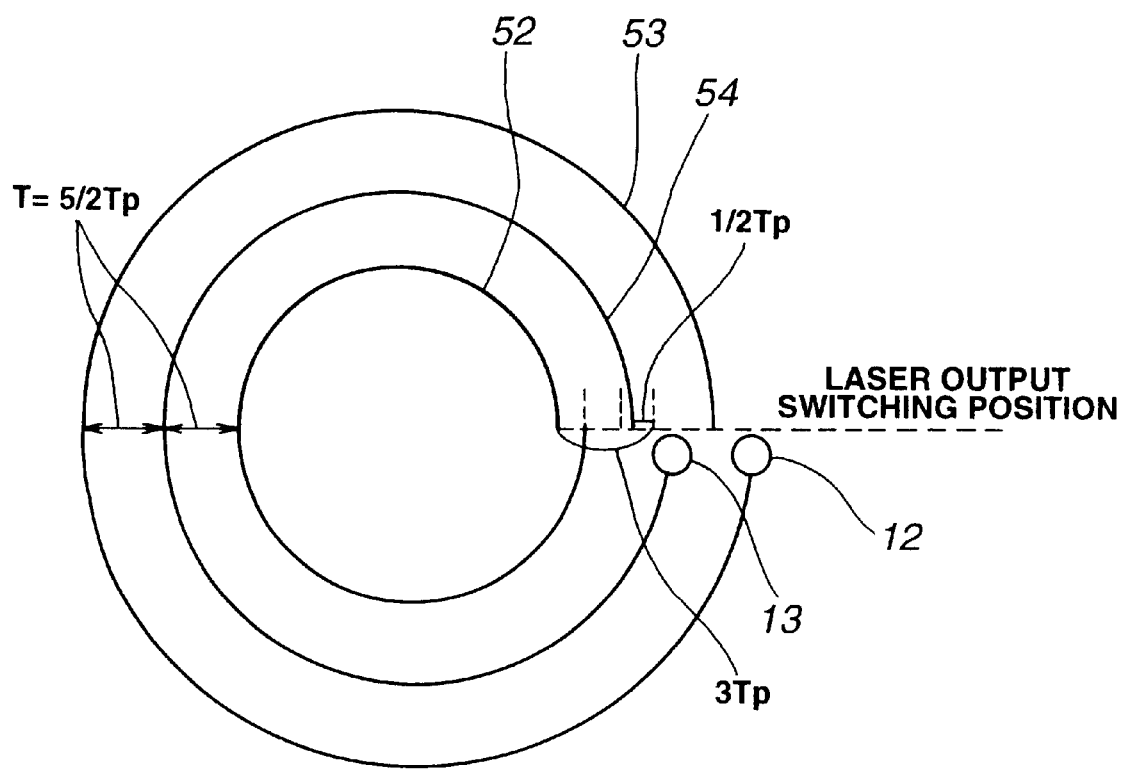
FIG. 16 is a plan view of another example of recesses formed on the optical disc substrate according to the present invention.
Figure 17:
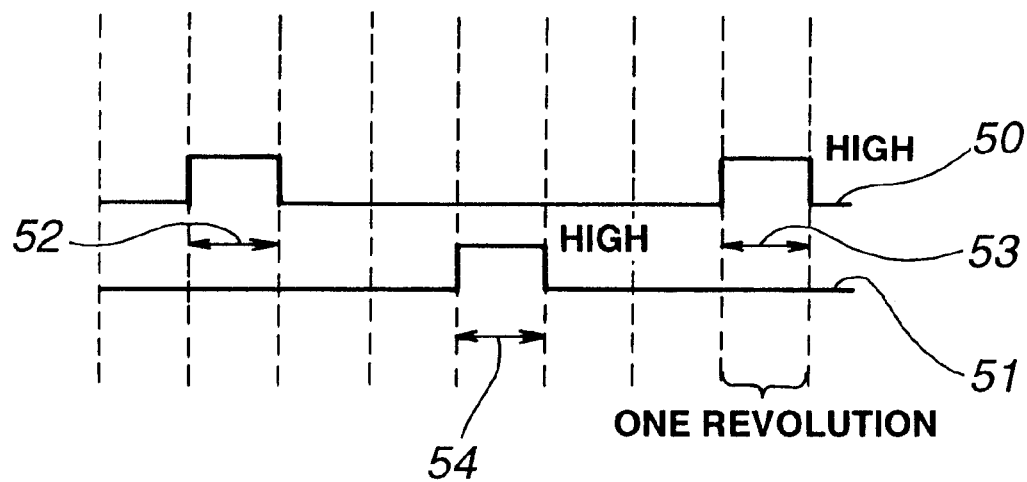
FIG. 17 is a timing chart of pulses controlling the laser in forming the recesses during the laser exposure.

FIG. 16 shows recess latent images thus formed, and FIG. 17 shows pulses used to control the laser sources.

More particularly, pulses 50 and 51 shown in FIG. 16 are control pulses applied to an optical modulating element in the laser source. When at their HIGH level, these pulses 50 and 51 allow the laser source to generate a laser beam.

The second laser source 13 is located at a distance of ½ Tp radially from the first laser source 12 as shown in FIG. 16, for example, at a distance of ½ Tp toward the center of the optical disc 1. They are operatively coupled with each other.

To form the recess latent image, the control pulse 50 allows the first laser source 12 to generate a first laser beam for a period of one rotation of the glass substrate 10 at every 5 rotations as shown in FIG. 16, for example, and the control pulse 51 allows the second laser source 13 located at a distance of ½ Tp from the first laser source 12 to generate a second laser beam for a similar period of three rotations phase-shifted from the generation of the first laser beam.

More particularly, the photoresist layer 11 is exposed to the first laser beam from the first laser source 12 for a period of one rotation at every 5 rotations of the glass substrate 10 to form recess latent images 52 and 53, and then to the second laser beam from the second laser source 13 located at the distance of ½ Tp from the first laser source 12 for a same period as in the exposure to the first laser beam and after two rotations of the glass substrate 10 from the exposure to the first laser beam to form a recess latent image 54.

For such alternate exposures of the photoresist layer 11, the first and second laser beams are generated at every interval of 3 Tp as shown in FIG. 17. Since the first and second laser sources 12 and 13 are spaced ½ Tp from each other, however, the pitch T of the recesses 52 and 54 thus formed as in FIG. 16 is 5/2 Tp as determined from the relation given below:

$$3 \text{ Tp} - \tfrac{1}{2} \text{ Tp} = \tfrac{5}{2} \text{ Tp}$$

The recess latent images 52, 53 and 54 are developed in the aforementioned development process to form recesses having a pitch of 5/2 Tp.

As mentioned above, the recesses 4a having a pitch of (2n+1)/2×Tp (where n>0), that is, the recess latent images can be formed in an area 11b corresponding to an area inside the inner circumference of the information recording area 2, namely, an area on the photoresist layer 11 corresponding to the marker area 4, by switching the two laser sources, that is, the first laser source 12 and the second laser source 13 located at the distance of ½ Tp from the first laser source 12, from one to the other, at every n rotations of the glass substrate 10 having the photoresist layer 11 formed thereon to expose the photoresist layer 11 alternately to the first and second laser beams scanned at a laser beam feed pitch equal to the track pitch Tp in the information recording area 2.

Note that as mentioned above, either a single laser source or a plurality of laser sources may be used for the alternate laser exposure.

Also note that to form concentric recesses, the movement of the objective lens may be adjusted so that the objective lens is stopped for one rotation during a laser exposure.

The conventional optical disc stamper exposure machine is not adapted to vary its optical head feed pitch, so the exposure machine has to be reset once to put a system including the optical head into a standby status at the zero point in order to form the recesses 4a having a different pitch from the track pitch Tp in the information recording area 2. Therefore, the optical disc substrates cannot be manufactured with a high productivity.

On the contrary, the method of producing the stamper for optical disc substrates according to the present invention permits to form inside the inner circumference of the information recording area 2 the recesses 4a having a larger pitch T than the track pitch Tp in the information recording area 2 just by switching the laser sources from one to the other, namely, just by turning on and off the laser output at every n rotation of the glass substrate even with the laser beam feed pitch remained equal to the track pitch Tp in the information recording area 2. Thus, according to the present invention, optical disc substrates can be manufactured with an improved productivity.

In the experiments done on the present invention, an optical disc stamper was produced by the method of producing the stamper according to the present invention, and the stamper thus produced was used to manufacture an optical disc, as will further be described below.

First, for an optical disc substrate having a track pitch Tp of 1.15 μm in an information recording area thereof (130 mm in diameter and 2.6 GB in data storage capacity as prescribed in ISO), the laser exposure process included in the method according to the present invention was effected to switch two laser sources as shown in FIG. 15 from one to the other at every rotation (n=1) of the glass substrate. Thus, recesses could be formed at a pitch of 1.75 μm (3/2×Tp).

Thereby, even the conventional hubbing machine could be used to identify the boundary of the information recording area on the optical disc substrate of the track pitch Tp of 1.15 μm, and.;the hub could be joined to the optical disc substrate in a correct position.

On the other hand, for an optical disc substrate having a track pitch Tp of 0.85 μm in an information recording area thereof (130 mm in diameter and 5.2 GB in data storage capacity as prescribed in ISO), the laser exposure process included in the method according to the present invention was effected to turn on and off a single laser source as shown in FIG. 10 alternately at every rotation (n=1) of the glass substrate. Thus, recesses could be formed at a pitch of 1.7 μm (2Tp) between the recess centers. Thereby, even the conventional hubbing machine could be used to identify the boundary of the information recording area on the optical disc substrate of the track pitch Tp of 0.85 μm, and the hub could be joined to the optical disc substrate in a correct position.

As apparent from the aforementioned results of the experiments, the method of producing the stamper for optical discs according to the present invention permits to form recesses having a distance of about 1.6 μm between the centers thereof at which the reflected quantity of light can be detected, independently of the magnitude of the track pitch in the information recording area.

As seen from the aforementioned detailed description, the optical disc according to the present invention has the recesses formed inside the inner circumference of the information recording area thereof and at a larger pitch than the track pitch in the information recording area. Therefore, the recesses can reflect, in a constant and sufficient quantity for detection, a light irradiated from a hubbing machine during hubbing of an optical disc substrate without the necessity of changing the incident angle and quantity of light from the hubbing machine correspondingly to the magnitude of the track pitch in the information recording area.

Thus, the present invention permits to easily identify, based on the reflected light, the boundary inside the inner circumference of the information recording area with reference to the recesses, thereby permitting to join a hub to the optical disc in a correct position.

Also as having been described in detail in the foregoing, the optical disc manufacturing method according to the present invention positions a hub with respect to an optical disc substrate with reference to the recesses formed inside the inner circumference of the information recording area, so that the hub can be joined accurately to the optical disc substrate independently of the magnitude of the track pitch in the information recording area.

As having previously been described, the method of producing a stamper for optical disc substrates according to the present invention turns on and off the laser beam when exposing the photoresist layer while scanning the laser beam radially of the substrate, to form, by the laser exposure, the concentric or spiral continuous or discontinuous recesses at the larger pitch than the track pitch in the information recording area, so that the recesses can reflect, in a constant and sufficient quantity, a light is irradiated from the hubbing machine during installation of a hub to the optical disc substrate, without the necessity of changing the incident angle and quantity of light from the hubbing machine correspondingly to the magnitude of the track pitch in the information recording area.

Thus, for an optical disc manufactured using the stamper, it is possible to easily identify, based on the reflected light from the recesses, the boundary inside the inner circumference of the information recording area with reference to the recesses, thereby permitting to join a hub to the optical disc in a correct position.

Also, since the marker area in which the recesses are formed to correctly position the hub with respect to the optical disc is located inside the information recording area, the X-Y stage may not be much moved to the boundary of the information recording area, whereby the efficiency of hub installation can be improved.

Also, the conventional stamper exposure machine can be used to form the recesses having a different distance between the recess centers from the track pitch in the information recording area without variation of the laser feed pitch. Thus, the stamper exposure machine has not to be stopped once to form tracks at different pitches, whereby the optical discs can be manufactured at an improved productivity.

What is claimed is:

1. An optical disc having an annular information recording area and a hub fixed substantially in the center thereof, the optical disc having a reference marker area formed inside the inner circumference of the information recording area, said reference marker area for positioning the hub with respect to the optical disc and said reference marker area comprising recesses having a larger pitch than a track pitch in the information recording area, wherein given the track pitch in the information recording area $T_p$, a recess pitch is $(n+1) \times T_p$, where n is an integer larger than 1.

2. The optical disc as set forth in claim 1, wherein given a track pitch in the information recording area of Tp, the recess pitch is $(2n+1)/2 \times Tp$ where n is an integer larger than 1.

3. The optical disc as set forth in claim 1, wherein the track pitch in the information recording area is 1.0 μm or less.

4. A method of manufacturing an optical disc, wherein a hub is installed substantially in the center of an optical disc substrate having an annular information recording area formed thereon, by forming a reference marker area having recesses in an area inside the inner circumference of the information recording area at a larger pitch than the track pitch in the information recording area and then positioning the hub with respect to the optical disc substrate with reference to the recesses of the reference marker area, wherein given the track pitch in the information recording area $T_p$, a recess pitch is $(n+1) \times T_p$ where n is an integer larger than 1.

5. A method of producing a stamper for optical disc substrates by exposing a photoresist layer applied to the surface of a glass substrate while rotating the glass substrate and scanning a laser beam radially of the glass substrate, wherein the laser beam is selectively turned on and off to form a reference marker area having recesses in an area inside the inner circumference of an information recording area on the optical disc substrate at a larger pitch than the track pitch Tp in the information recording area, the laser beam being fed radially of the optical disc substrate at a pitch substantially equal to the track pitch $T_p$ in the information recording area, and laser exposure is repeated for a period of one rotation at every n rotations to form recesses having a pitch of $(n+1) \times T_p$.

6. The method as set forth in claim 5, wherein a pair of laser sources is disposed radially at an interval of a half of the track pitch Tp in the information recording area, the laser beam is fed radially of the optical disc substrate at a pitch substantially equal to the track pitch Tp in the information recording area, and laser exposure is repeated for a period of one rotation at every n rotations to form recesses having a pitch of $(2n+1)/2 \times Tp$.

7. The optical disc as set forth in claim 1 wherein said recesses are selected from the group consisting of concentric recesses, spiral continuous recesses, or spiral discontinuous recesses.

8. The method of manufacturing an optical disc as set forth in claim 4 wherein said recesses are selected from the group consisting of concentric recesses, spiral continuous recesses, or spiral discontinuous recesses.

9. The method of producing a stamper as set forth in claim 5 wherein said recesses are selected from the group consisting of concentric recesses, spiral continuous recesses, or spiral discontinuous recesses.

* * * * *